J. W. PETTY.

COTTON BALE-TIE.

No. 7,360. Reissued Oct. 24, 1876.

WITNESSES
E. H. Bates
John F. Acker

INVENTOR.
Joseph W. Petty.
Gilmore, Smith & Co.
ATTORNEYS.

UNITED STATES PATENT OFFICE.

JOSEPH W. PETTY, OF NEW ORLEANS, LOUISIANA.

IMPROVEMENT IN COTTON-BALE TIES.

Specification forming part of Letters Patent No. 62,560, dated March 5, 1867; reissue No. 7,360, dated October 24, 1876; application filed September 2, 1876.

*To all whom it may concern:*

Be it known that I, JOSEPH W. PETTY, of the city of New Orleans, parish of Orleans, and State of Louisiana, have invented a new and valuable Bale Tie or Hoop for Securing Cotton-Bales and other Articles; and I do hereby declare the following to be a full, clear, and exact description of the same, reference being had to the accompanying drawings, forming part of this specification, and to the letters and figures of reference marked thereon.

Figure 1:
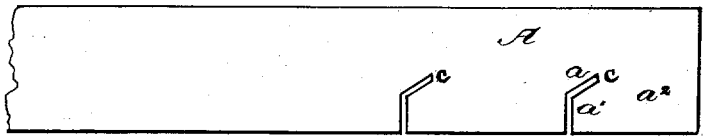
Figure 2:
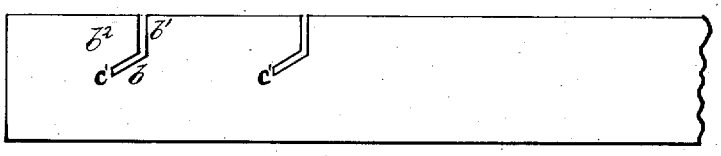
Figure 3:
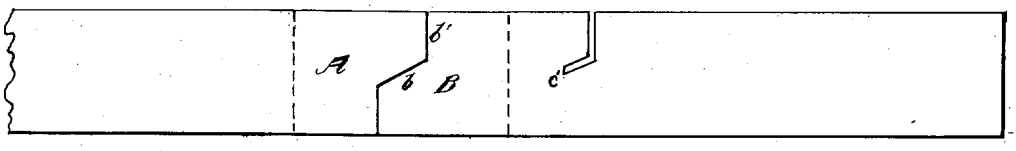

Figure 1 is a plan view of one end of my bale tie, hoop, or band. Fig. 2 is a plan view of the other end of said bale tie, hoop, or band. Fig. 3 is a plan view of said ends when joined together, as hereinafter described.

The object of my invention is to provide a mode of securely fastening together the ends of iron bands without using buckles, sleeves, or other supplementary devices. For this purpose, I cut by any suitable mechanism a series of narrow oblique clefts or slots into the opposite sides of the two ends of the band, each of said slots connected to one of the edges of said band, and adapted to interlock with the corresponding slot of the other end thereof, the inner ends of said oblique slots being made at right angles to the edges of said tie, for the purpose hereinafter set forth.

In the annexed drawings, *a* designates a forwardly-inclined slot on one side of the central longitudinal line of one of the ends A of a bale tie or band. Said slot extends forward away from the nearer edge or side of said band, and its rearward end is connected therewith by another slot, $a^1$, at right angles with said edge. This construction of said slot leaves a hook, $a^2$, between the same and the edge of said tie end or band end A.

The inner end *c* of the inclined slot is made square, or at right angles to the edge of the band, in order to make the ends of the bale-tie detachable without injury. If the ends of the inclined slots were constructed so that they could wedge together, it would become necessary to cut the bale-tie. The other end, B, of said bale tie or band is constructed with a similar inclined slot, *b*, extending in the opposite direction, and a similar connecting-slot, $b^1$, extending from said slot *b* to the opposite edge of the band or tie from that to which slot $a^1$ extends. This construction leaves a hook, $b^2$, similar to hook $a^2$ between slots $b$ $b^1$ and the last-mentioned edge of said bale-tie end. The inner end $c'$ of the inclined slot is made square, as shown, in order to allow the separation of the said bale tie, as above set forth.

To effect a fastening the slots $a$ $a^1$ and $b$ $b^1$ are made to engage while the bale of cotton, hay, or other material is under compression, thereby forming a hooked connection, and as soon as the compression is removed, the expansive force of said compressed bale induces a tension upon said bale tie or band. When the oblique or inclined slots or parts of said slots are drawn against one another, and act (upon the principle of the wedge) to hold the ends A B parallel, and establish a firm connection between them, the greater the tension the more tenacious becomes the fastening.

If the angle of forty-five degrees (which I prefer to give the slots) be not enough to induce an immediate and secure tie the moment that tension is put upon the bands, said angle may be increased or diminished, as desired.

When said bale tie or band and bale are to be subjected to rough treatment, it sometimes becomes necessary to strengthen the attachment of said ends A B by driving nails through the lapping parts of said ends. The number of slots in said ends may be increased or diminished at will.

What I claim as new, and desire to secure by Letters Patent, is—

1. A bale-tie provided near each end with an oblique or inclined hooking-slot, adapted for hooking or clasping around a bale.

2. In a bale-tie, an inclined hooking-slot, communicating with the outer edge of the bale-tie band, for the purpose set forth.

3. The combination of the ends A B of an iron band, provided with slots $a$ $a^1$ and $b$ $b^1$, substantially as set forth.

4. In an iron bale-tie having slots in its side that serve as hooks or clasps, the square inner end *c* of said slots, substantially as shown, and for the purpose set forth.

In testimony that I claim the above I have hereunto subscribed my name in the presence of two witnesses.

J. W. PETTY.

Attest:

ANDREW HERO, Jr.,
J. CONVERSE.